US010114866B2

(12) United States Patent
Mueller et al.

(10) Patent No.: US 10,114,866 B2
(45) Date of Patent: Oct. 30, 2018

(54) MEMORY-CONSTRAINED AGGREGATION USING INTRA-OPERATOR PIPELINING

(71) Applicant: SAP SE, Walldorf (DE)

(72) Inventors: Ingo Mueller, Frankfurt (DE); Arnaud Lacurie, Mannheim (DE)

(73) Assignee: SAP SE, Walldorf (DE)

( * ) Notice: Subject to any disclaimer, the term of this patent is extended or adjusted under 35 U.S.C. 154(b) by 287 days.

(21) Appl. No.: 15/040,501

(22) Filed: Feb. 10, 2016

(65) Prior Publication Data

US 2017/0228319 A1    Aug. 10, 2017

(51) Int. Cl.
| | |
|---|---|
| G06F 17/30 | (2006.01) |
| G06F 12/0895 | (2016.01) |
| G06F 12/0864 | (2016.01) |
| G06F 12/02 | (2006.01) |
| G06F 12/1018 | (2016.01) |

(52) U.S. Cl.
CPC ........ *G06F 17/3048* (2013.01); *G06F 12/023* (2013.01); *G06F 12/0864* (2013.01); *G06F 12/0895* (2013.01); *G06F 12/1018* (2013.01); *G06F 17/3033* (2013.01); *G06F 17/30528* (2013.01); *G06F 17/30554* (2013.01); *G06F 17/30584* (2013.01); *G06F 2212/604* (2013.01)

(58) Field of Classification Search
CPC .................................................. G06F 17/3033
USPC ....................................... 707/747, 698, 704
See application file for complete search history.

(56) References Cited

U.S. PATENT DOCUMENTS

| | | |
|---|---|---|
| 5,230,047 A | 7/1993 | Frey, Jr. et al. |
| 5,850,547 A | 12/1998 | Waddington et al. |
| 5,884,299 A | 3/1999 | Ramesh et al. |
| 6,708,178 B1 | 3/2004 | Chong et al. |
| 6,859,808 B1 | 2/2005 | Chong et al. |
| 6,957,225 B1 | 10/2005 | Zait et al. |
| 7,054,872 B1 | 5/2006 | Das et al. |
| 7,065,215 B2 | 6/2006 | Shirakawa et al. |
| 7,124,147 B2 | 10/2006 | Perry |
| 7,216,338 B2 | 5/2007 | Barnett et al. |

(Continued)

FOREIGN PATENT DOCUMENTS

EP        2469423 A1     6/2012

OTHER PUBLICATIONS

Mehul A. Shah et al. ("Flux: An Adaptive Partitioning Operator for Continuous Query Systems" Report No. UCB/CSD-2-1205, Oct. 2002, Computer Science Division (DDCS), University of California, Berkeley, California 94720).*

(Continued)

*Primary Examiner* — Hung T Vy

(74) *Attorney, Agent, or Firm* — Sterne, Kessler, Goldstein & Fox, PLLC

(57) ABSTRACT

Disclosed herein are system, method, and computer program product embodiments for constraining the amount of memory used during data aggregation. An embodiment operates by separating input data into a plurality of partitions. The embodiment then inserts portions of the input data into blocks from a free list at a given level of a pipeline. The embodiment then inserts the blocks into buffers for processing at a subsequent level of the pipeline. The embodiment processes the inserted blocks at the subsequent level of the pipeline and concatenates the intermediate results into a final aggregate result.

20 Claims, 7 Drawing Sheets

(56) References Cited

U.S. PATENT DOCUMENTS

| | | | |
|---|---|---|---|
| 7,469,241 | B2 | 12/2008 | Bellamkonda et al. |
| 7,610,283 | B2 | 10/2009 | Arasu et al. |
| 7,680,765 | B2 | 3/2010 | Meijer et al. |
| 7,779,008 | B2 | 8/2010 | Dageville et al. |
| 7,809,674 | B2 | 10/2010 | Chong et al. |
| 7,917,494 | B2 | 3/2011 | Müller |
| 8,321,385 | B2 | 11/2012 | Burroughs et al. |
| 8,397,051 | B2 | 3/2013 | Beaman et al. |
| 8,510,329 | B2 | 8/2013 | Balkir et al. |
| 8,661,037 | B2 | 2/2014 | Narang et al. |
| 8,738,608 | B2 | 5/2014 | Pauly |
| 8,825,665 | B2 | 9/2014 | Harbarth et al. |
| 8,996,563 | B2 | 3/2015 | Bender et al. |
| 9,213,732 | B2 | 12/2015 | Müller et al. |
| 9,679,056 | B2 | 6/2017 | Zhu et al. |
| 2007/0100793 | A1* | 5/2007 | Brown .............. G06F 17/30557 |
| 2009/0164412 | A1 | 6/2009 | Bestgen et al. |
| 2012/0011144 | A1 | 1/2012 | Transier et al. |
| 2012/0290615 | A1 | 11/2012 | Lamb et al. |
| 2014/0351239 | A1 | 11/2014 | Davis et al. |
| 2015/0120652 | A1 | 4/2015 | Dittrich et al. |
| 2015/0248476 | A1 | 9/2015 | Weissinger et al. |

OTHER PUBLICATIONS

John Cieslewicz et al., "Adaptive Aggregation on Chip Multiprocessors," Sep. 25, 2007, http://www.vldb.org/conf/2007/papers/research/p339-cieslewicz.pdf, 12 pages.

David J. DeWitt et al., "Parallel Database Systems: The Future of High Performance Database Processing," Common. ACM, 35(6), Jan. 1992, 26 pages.

"Hash table," Wikipedia, retrieved Feb. 24, 2016, http://en.wikipedia.org/wiki/Hash_table, 16 pages.

Marcin Zukowiski et al., "Architecture-Conscious Hashing," Proceedings of the 2nd International Workshop on Daa Management on New Hardware (DaMoN 2006), Jun. 25, 2006, ACM, 8 pages.

Goetz Graefe, "Query Evaluation Techniques for Large Databases," AMC Computing Surveys 25(2) Nov. 10, 1993, 168 pages.

European Search Report dated Sep. 29, 2011, for European Application No. 11004931.9-1225, 7 pages.

Extended European Search Report dated Mar. 5, 2014, for European Application No. 13198634.1, 11 pages.

Hasso Plattner, "SanssouciDB: An In-Memory Database for Processing Enterprise Workloads," Jan. 31, 2011, http://ares.epic.hpi.uni-potsdam.de/apps/static/papers/btw2011_lattest.pdf, 20 pages.

Martina-Cezara Albutiu et al., "Massively Parallel Sort-Merge Joins in Main Memory Multi-Core Database Systems," Proceeding of the VLDB Endowment, Aug. 2012, vol. 5, No. 10, pp. 1064-1075.

Merrill et al., "High Performance and Scalable Radix Sorting: A Case Study of Implementing Dynamic Parallelism for GPU Computing," Parallel Processing Letters 21, 2011—Pre-Print, 28 pages.

Spyros Blanas et al., "Design and Evaluation of Main Memory Hash Join Algorithms for Multi-Core CPUs," SIGMOD '11, Jun. 2011, 12 pages.

Changkyu Kim et al., "Sort vs. Hash Revisisted: Fast Join Implementation on Modern Multi-Core CPU," VLDB '09, 2009, 12 pages.

Pouria Pirzadeh et al., "Performance Evaluation of Range Queries in Key Value Stores," J Grid Computing, Mar. 30, 2012, vol. 10, 24 pages.

Jens Krueger et al., "Applicability of GPU Computing for Efficient Merge in In-Memory Databases," The Second International Workshop on Accelerating Data Management Systems using Modern Processor and Storage Architectures, 2011, 8 pages.

Hrishikesh Amur et al., "Memory-Efficient GroupBy-Aggregate using Compressed Buffer Trees," SoCC' 13, 2013, 16 pages.

Wikipedia, "Barrier (computer science)," last retrieved Apr. 18, 2018, https://en.wikipedia.org/wiki/Barrier_(computer_science).

Wikipedia, "Parallel computing," last retrieved Apr. 18, 2018, https://en.wikipedia.org/wiki/Parallel_computing.

Wikipedia, "Table (database) ," last retrieved Apr. 18, 2018, http://en.wikipedia.org/wiki/Table_(database).

European Search Report dated Oct. 19, 2016 for European Application No. 16001194.6, 6 pages.

Muller, Ingo et al., "Cache-Efficient Aggregation: Hashing is Sorting," Proceedings of the 2015 ACM SIGMOD International Conference on Management of Data, Published on May 27, 2015, pp. 1123-1136.

ACM Digital Library, "Bibliography: Cache-Efficient Aggregation: Hashing is Sorting," May 27, 2015, Retrieved from the Internet Oct. 12, 2016: http://dl.acm.org/citation.cfm?id=2747644#.

Sompolski, Justin, "Just-in-Time Compilation in Vectorized Query Execution," Thesis, University of Warsaw, 2011, pp. 1-92.

* cited by examiner

MEMORY-CONSTRAINED AGGREGATION USING INTRA-OPERATOR PIPELINING

CROSS-REFERENCE TO RELATED APPLICATIONS

The present application is related to U.S. patent application Ser. No. 14/726,251 filed May 29, 2015, U.S. patent application Ser. No. 13/729,111 filed Dec. 28, 2012, and U.S. patent application Ser. No. 12/978,194 filed Dec. 23, 2010 which are hereby incorporated by reference in their entirety.

BACKGROUND

Databases can be used to store many data values. But sometimes it is helpful to have a more bird's eye view of the data that is provided. With data aggregation, thousands or even millions of database records can be aggregated or viewed in a summary form to provide a different view of the stored data. But the data aggregation process often consumes a great deal of memory, especially as the number of stored database records grow. Specifically, the data aggregation process often produces intermediate results which consume a great deal of memory prior to producing the final aggregated result. This is often problematic for in-memory database systems because queries may have to be aborted when the system runs out of memory, or new queries may not be admitted for processing because not enough free memory is available for their execution.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for constraining the amount of memory used during data aggregation. An embodiment operates by separating input data into a plurality of partitions. The embodiment then inserts portions of the input data into blocks from a free list at a given level of a pipeline. The embodiment then inserts the blocks into buffers for processing at a subsequent level of the pipeline. The embodiment processes the inserted blocks at the subsequent level of the pipeline and concatenates the intermediate results into a final aggregate result. By overlapping the production and consumption of intermediate results during data aggregation the amount of memory utilized can be reduced without compromising performance.

Figure 1:
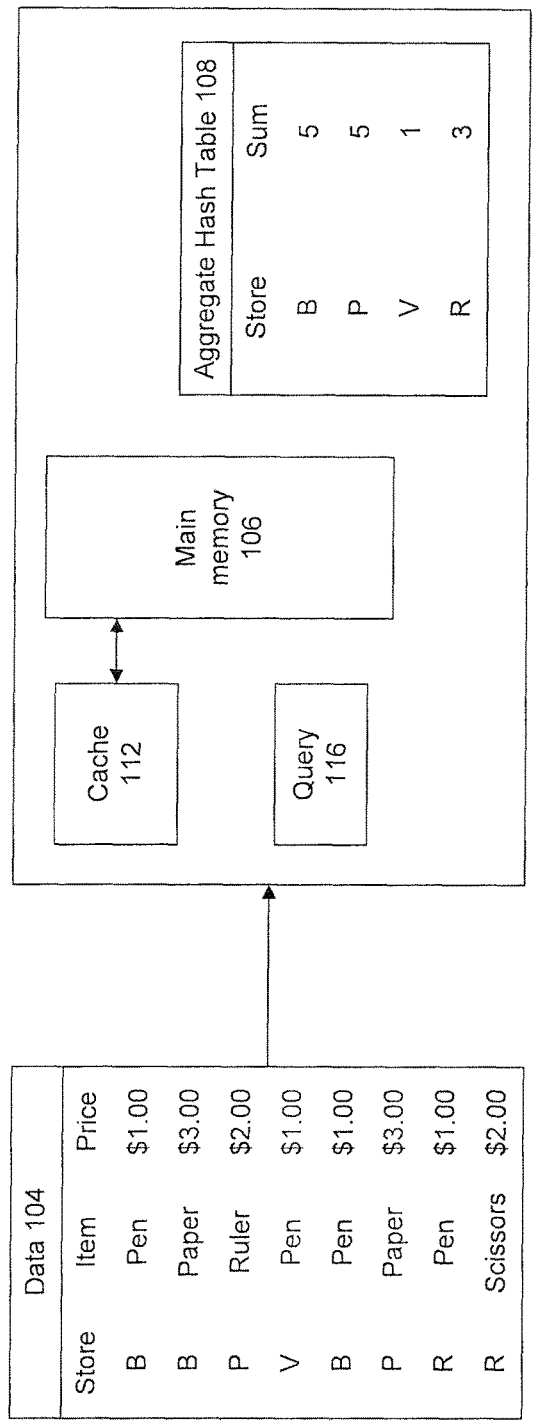
FIG. 1 is a block diagram of a database aggregation optimization system, according to an example embodiment.

FIG. 1 is a block diagram 100 of a database aggregation system, according to an example embodiment. Database aggregation system (DAS) 102 may improve or even optimize a database aggregation process. DAS 102 may, for example, receive a query 116 on data 104 that may require an aggregation of data 104 to provide a response to query 116. As described in greater detail below, DAS 102 may generate an aggregate hash table 108 to respond to query 116.

DAS 102 may receive data 104 (e.g., as input from one or more computers or systems, which may be remotely located over a network), that may be at least partially stored in main memory 106 (across one or more computers). Aggregate hash table 108 may be a summary or aggregation of at least a portion of data 104 that is stored in main memory 106. Aggregate hash table 108 may, for example, divide data 104 into a number of different groups and provide access to statistics, data, or other data aggregation parameters pertinent to each group or group(s) and/or that are necessary to respond to one or more queries 116.

FIG. 1 shows an exemplary set of data 104 (which may be received and/or stored or organized in main memory 106), and an exemplary aggregate hash table 108 of the data aggregated into different groups. In the example of FIG. 1, the exemplary data 104 includes data about products (pen, paper, ruler, scissors) that were sold at different store locations (Berlin, Paris, Venice, and Rome) and the prices of the products that were sold.

The exemplary aggregate hash table 108 shows one embodiment of how data 104 may be grouped and aggregated. In the example shown, the data is grouped or aggregated based on the store location, and provides the sum of products or inventory sold at each location. In other examples, data 104 could have been differently grouped and aggregated into aggregate hash table 108 (based on any combination of one or more columns of data). For example, data 104 could have been grouped by the items, or could have been grouped by items and location. Or, for example, multiple aggregate hash tables 108 could be simultaneously or sequentially generated by DAS 102, each aggregate hash table 108 including different aggregations of data 104 according to different groupings. It is understood that there could be many different ways to group or aggregate data 104 for aggregate hash table 108 and that multiple aggregate hash tables 108 may be generated for the same set or different sets (or subsets) of data 104.

When processing data 104 and generating aggregate hash table 108, there are often a number of data accesses 110 (which may include data transfers) that may occur between a cache 112 and main memory 106 where data 104 is stored. However data transfers 110 are expensive in that they often require additional computing resources and time to execute (relative to data 104 already being stored in cache 112), which over the course of thousands or millions of records can add up and require additional processing power and/or processing delays. As such, in an embodiment, DAS 102 minimizes (or at least reduces) or optimizes both the number of transfers 110 between cache 112 and main memory 106 and/or the number of memory 106 accesses, while generating one or more aggregate hash tables 108 and/or responding to query 116. As used herein, it is understood that data transfer 110 (between cache 112 and main memory 106) and data access 110 (to cache 112 or main memory 106) may be used interchangeably.

Cache 112 may be a fast-access storage location relative to main memory 106 (which is slower). For example, main memory 106 may include or be a portion of random access memory (RAM) or a hard-disk used to store data 104, while cache 112 may be any storage that is faster access than main memory 106. In an embodiment, main memory 106 may be a hard disk, and cache 110 may be any memory location that has faster access than the hard disk, such as RAM. As such, main memory 106 accesses 110 may be more time consuming than cache 110 accesses 110. However, main memory 106 may include more storage than cache 112, and data 104 may not be able to be stored only in cache 112. In an embodiment, cache 112 may be volatile memory, while main memory 106 is non-volatile memory. Data modifications (i.e., additions, modifications, deletions) may occur within cache 112.

When data 104 is to be aggregated, it needs to be accessed 110 from main memory 106 and aggregated data for aggregate hash table 108 is written (110) into cache 112. If cache 112 is large enough to hold the entire aggregate or final hash table 108, then the process of data aggregation completes without extra data transfers 110 between cache 112 and main memory 106. However, extra data transfers 110 may be needed when the size of aggregate hash table 108 exceeds the size of cache 112. Because in such a case, the data of aggregate hash table 108 may need to be repeatedly transferred 110 back and forth between main memory 106 and cache 112 as the portion of the aggregate hash table 108 is needed, this process can become computationally expensive. DAS 102 optimizes or minimizes these extra data transfers 110 that may occur when the size of aggregate hash table 108 exceeds the size of cache 112.

For example, if the cache 112 of FIG. 1 could hold four or more data records, then the entire aggregate hash table 108 may be written to cache 112 without extra data transfers 110. However, if cache 112 can only hold three or fewer data records, then the aggregation of data 104 may require additional data transfers 110 to modify, build, or otherwise generate aggregate hash table 108.

Aggregate hash table 108 may be stored in cache 112 when being generated or when data 104 from main memory 106 is being aggregated. However, as noted above, cache 112 may be smaller than main memory 106, and it may be that aggregate hash table 108 may grow to exceed the size of cache 112. When this happens, at least a portion of aggregate hash table 108 may need to be transferred 110 to main memory 106 for storage. However if the transferred portion is needed again, it must be transferred 110 back to cache 112 to be updated (based on data aggregation), and a different portion of aggregate hash table 108 must be transferred into main memory. As such, continuing to aggregate the remaining data 104 from memory into aggregate hash table 108 could become very costly (e.g., requiring additional time and/or resources) very quickly, at least in part because of multiple, repeated, or otherwise additional data transfers 110.

Figure 2:
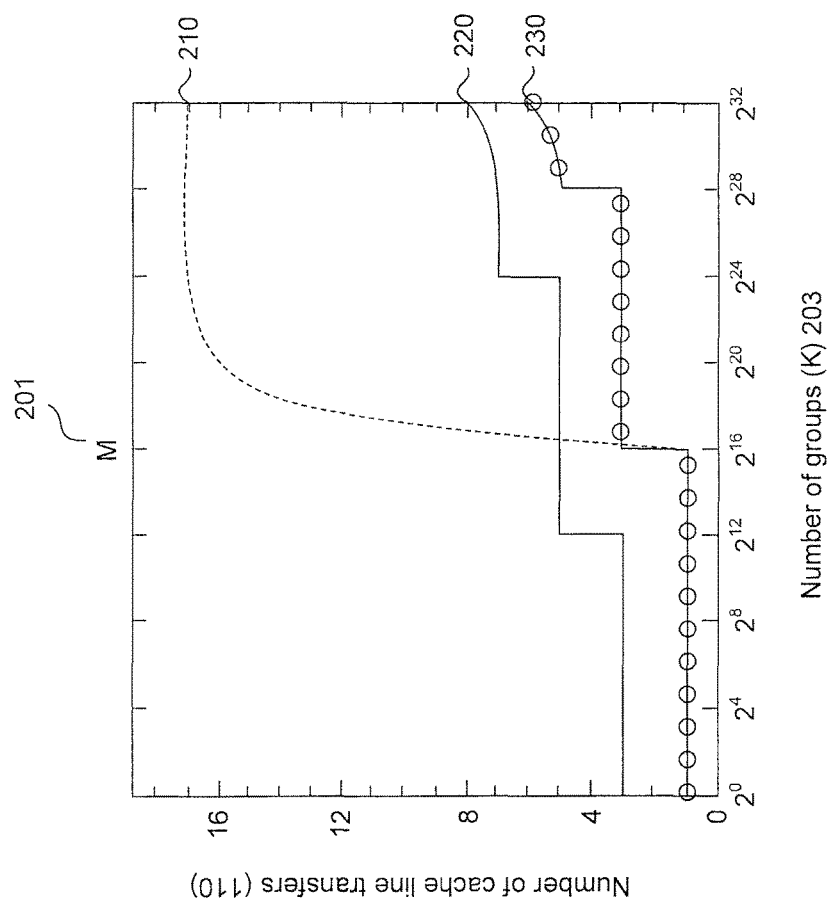
FIG. 2 is an illustration of the performance of different database aggregation processes, according to an example embodiment.

FIG. 2 is an illustration 200 of an example performance of different database aggregation processes, according to an example embodiment. FIG. 2 shows an example of how the number of data transfers 110 (also known as cache line transfers) increases once the size of the aggregate hash table 108 exceeds the cache size 201. In the example show, the number of cache line transfers is shown on a per record basis on the Y-axis.

Cache size 201 is the size of cache 112. For example, cache size 201 may be the number of records that may be stored in cache 112. The X-axis shows the number of groups 203 into which data 104 may be aggregated. For example, as noted above, in the exemplary data of FIG. 1, there are four groups 203 which are based on the store locations. The data provided in FIG. 2 illustrates another embodiment of exemplary data, and may vary in different implementations based on cache size 201 and number of groups 203.

The performance of the hash aggregation discussed above is shown by line 210 of FIG. 2. As shown, once the size of the aggregate hash table 108 exceeds the cache size 201 of cache 112, there is a significant increase in the number of data transfers 110 required to complete the aggregate hash table 108 and a steep degradation in performance.

One alternative that may be used to overcome the disadvantages of hash aggregation 210 (particular with regard to data transfers 110 performed beyond cache size 201), is a sort aggregation 220. In sort aggregation 220, data in main memory 106 may first be sorted into different groups. Then, on a second pass through the sorted data of main memory 106, the sorted data may be aggregated into aggregate hash table 108. This would minimize the number of aggregate hash table data transfers 110 between cache 112 and main memory 106. While sort aggregation 220 may be more efficient for larger aggregate hash tables 108 (e.g., where the number of groups 203 exceed the cache size 201), there is an additional overhead that is incurred on smaller aggregate hash tables 108.

DAS 102 performs the optimized aggregation processing shown as line 230. DAS 102 uses a hybrid approach that reduces the inefficiencies that result from using either hash aggregation 210 or sort aggregation 220 that maximizes performance. The details of how optimized aggregation 230 is performed is provided in greater detail below.

Figure 3:
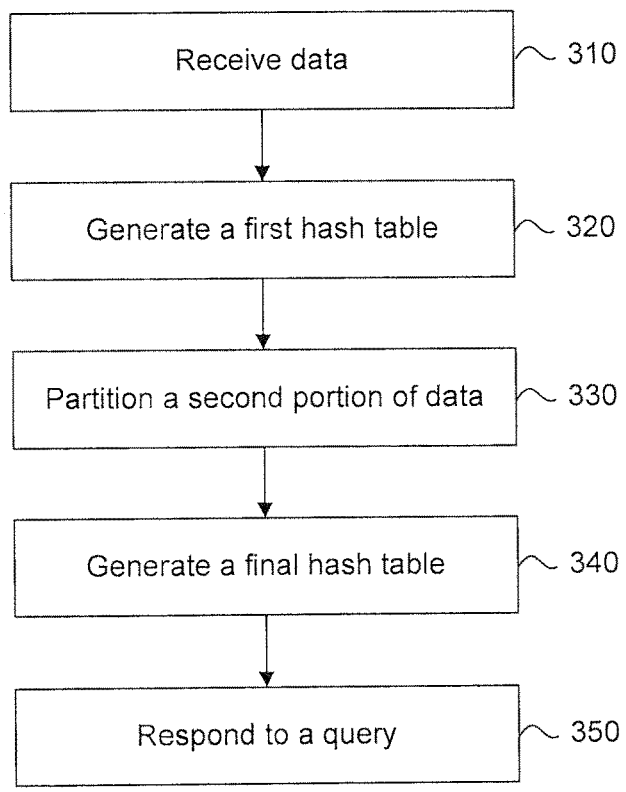
FIG. 3 is a flowchart illustrating a process for database aggregation optimization, according to an example embodiment.

FIG. 3 is a flowchart illustrating a process for database aggregation, according to an example embodiment. Method 300 can be performed by processing logic that can comprise hardware (e.g., circuitry, dedicated logic, programmable logic, microcode, etc.), software (e.g., instructions executing on a processing device), or a combination thereof. As referenced above, method 300 may be an illustration of how optimized aggregation (230) is performed by DAS 102.

In step 310, data is received. For example, DAS 102 may receive data 104 from one or more systems or computers, including over a network. Data 104 may be received, and stored in main memory 106. Main memory 106 may include a database, table, or other memory, and data 104 may be stored across one or more computing devices or processors.

In step 320, a first hash table is generated. For example, DAS 102 may perform a first data aggregation of a first portion of data 104. In an embodiment, DAS 102 may use the hash aggregation function 210 to generate the first hash table. If DAS 102 is able to aggregate all of the data 104 into aggregated hash table 108 (because aggregate hash table 108 fits within cache 112), the process completes. However, if aggregate hash table 108 grows to a size that is unable to fit entirely within cache 112 (i.e., cache size 201, when the number of groups or records 203 of aggregate hash table 108 exceed the maximum number of records 201 that can be stored in cache 112) on a first pass through data 104, then the processing continues to step 330.

In step 330, the second portion of data may be partitioned. As described above, a first portion of data may have been aggregated and stored in a first aggregate hash table 108. If all of the data 104 was not processed (e.g., because the size of the first aggregate hash table 108 exceeded the available cache space 201), this may leave a second portion of data in main memory 106 that has yet to be processed or aggregated for aggregate hash table 108. This second portion may be partitioned such that each partition can be processed and be aggregated into another intermediate hash table 108 that fits within the available cache 112 space. This process may repeat or continue for additional portions of data 104 until all the data 104 of main memory 106 required to be aggregated (to respond to query 116) is processed.

In an embodiment, prior to or corresponding with the partitioning of the second portion of data 104 from main memory, DAS 102 may sort or at least partially sort the second portion of data 104 (or all or substantially all of the remaining data 104) into groups for aggregation into one or more aggregate hash tables 108. In the exemplary data shown in FIG. 1, this sort may include sorting data 104 by city, or may include an alphanumeric sort of data 104.

In an embodiment, if cache 112 may be able to hold 2 records/groups of aggregate hash table 108, then data 104 may be partially sorted or partitioned such that all the Berlin and Paris records are sorted in a first partition while the Rome and Venice records are sorted into a second partition. Or, for example, the data 104 may be sorted and then partitioned based the cache size 201.

Sorting the records may allow for faster aggregation into one or more intermediate aggregate hash tables 108. In an embodiment, a first aggregate hash table 108 may be generated for the first partition (including records for Berlin and Paris), and a second intermediate aggregate hash table 108 may be generated for the second partition (including records for Rome and Venice). In an embodiment, the first and second intermediate hash tables 108 may either be generated sequentially or in parallel by multiple processors.

In step 340, one or more intermediate hash tables are generated. For example, as noted above with respect to step 320, an intermediate hash table 108 may be generated for each partition of the second portion of data. These intermediate hash tables may be generated sequentially or in parallel by different processors or threads.

In step 350, a final hash table may be aggregated. For example, aggregate hash table 108 may be generated. Then, the data from one or more intermediate hash tables may be copied into the final hash table 108 during a second pass over the data. Once their data is copied or moved into the final hash table, the intermediate hash tables may be discarded or the memory space otherwise made available again.

Figure 4:
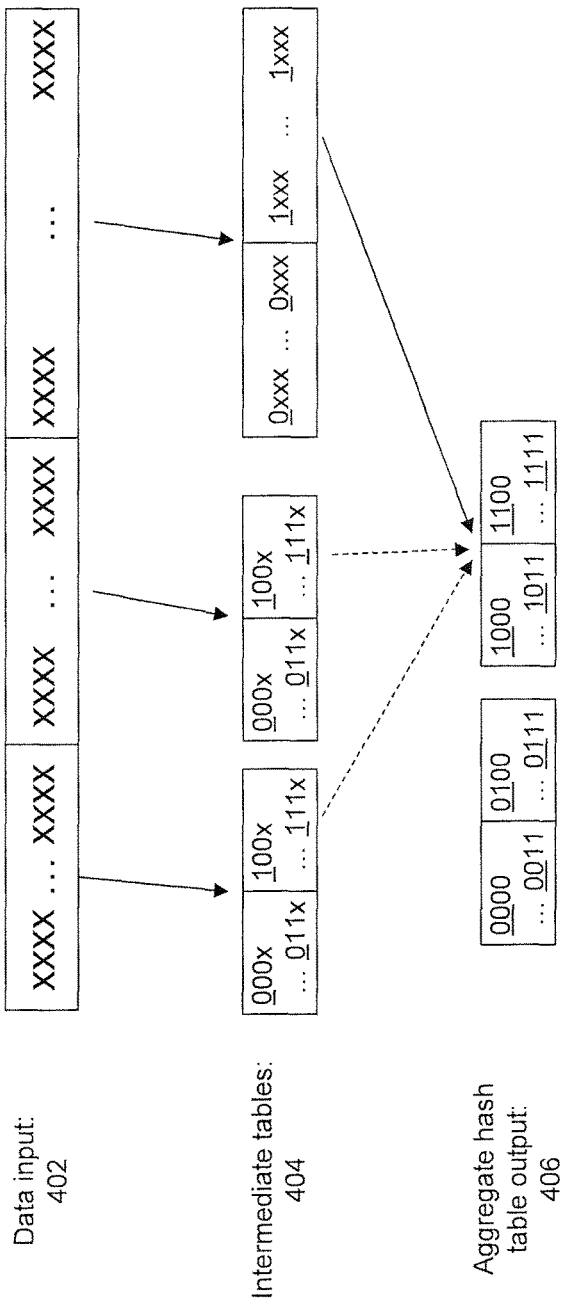
FIG. 4 illustrates an example process for database aggregation optimization, according to an embodiment.

FIG. 4 illustrates an example process for database aggregation, according to an embodiment. FIG. 4 illustrates an example in which multiple intermediate hash tables are created prior to generating a final hash table, according to an embodiment. In the example, data input 402 may be the second portion of data 104 or remaining data 104 in main memory 106 after the generation of a first intermediate hash table. Data input 402 may be sorted (as described above) and partitioned (as shown by the line breaks).

One or more processors may then aggregate the partitioned data input 402 into intermediate tables 404 (as described in step 360 above). The intermediate tables 404 may include intermediate hash tables or the partitions of data input 402.

The intermediate tables 404 may then be assembled into one or more final or aggregate hash tables or output 406. In an embodiment, as shown, any data input 402, intermediate tables 404, or aggregate hash table output 406 may be across multiple processors or memory locations even if from the same or related group of data input 402.

Referring back to FIG. 3, in step 360, a portion of aggregate hash table may be provided responsive to a query. For example, DAS 108 may receive query 116 on data 104. In an embodiment, data 104 may be aggregated in order to respond to query 116. For example, query 116 may request the total sum of goods sold in one or more of the store locations. As such, DAS 102 may aggregate data 104 in the manner described herein and provide a response to query 116.

Figure 5:
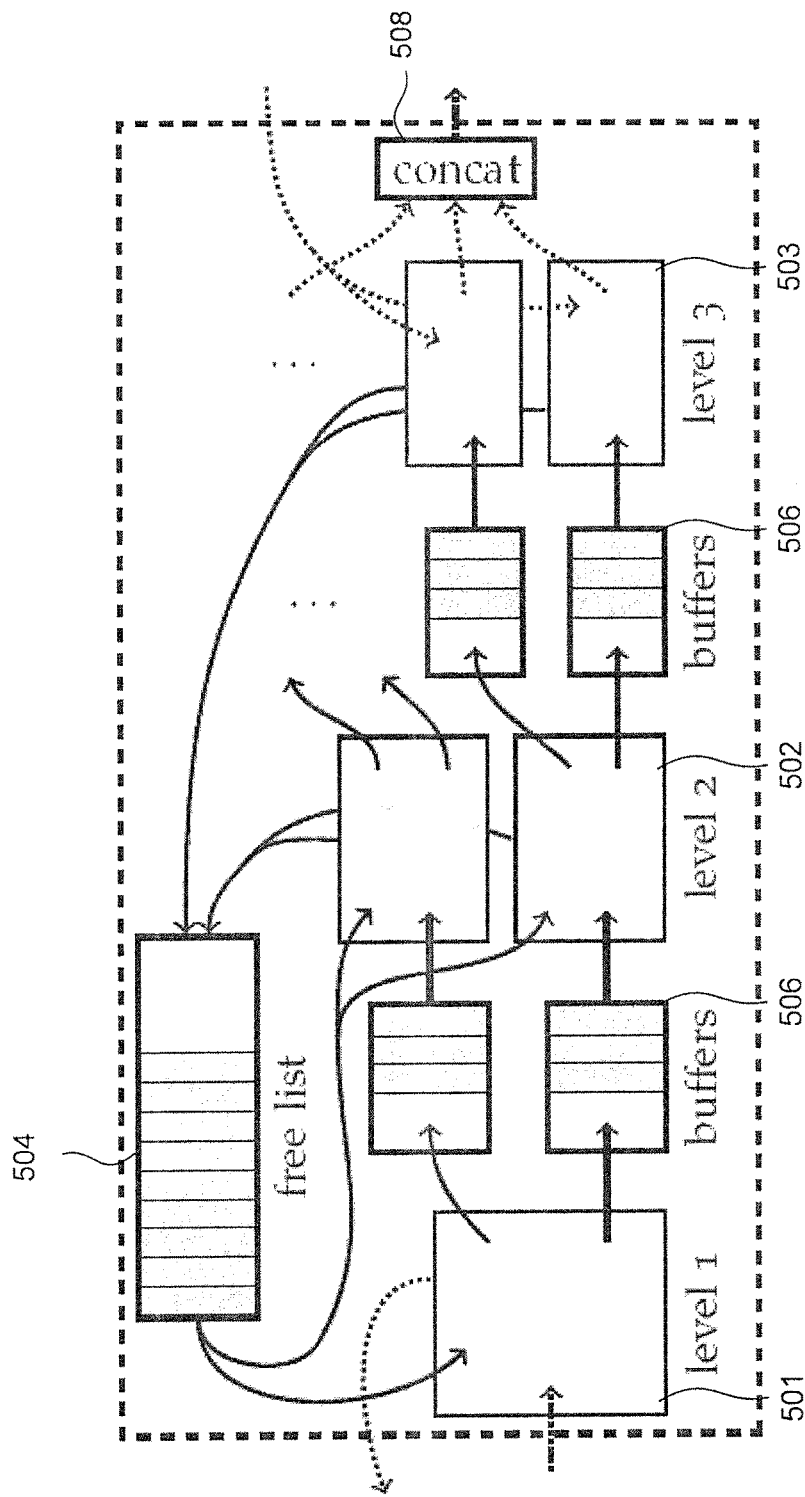
FIG. 5 illustrates an example process for memory-constrained database aggregation, according to an embodiment.

FIG. 5 illustrates an example process for memory-constrained database aggregation, according to an embodiment. FIG. 5 illustrates an example in which a database aggregation process overlaps the production and consumption of intermediate results. This overlapping of intermediate results enables the database aggregation process to control the amount of memory used during aggregation.

In an embodiment, level 501, level 502, and level 503 represent recursive stages of execution of a database aggregation process. Specifically, a solution of a stage of execution consists of solutions of smaller instances of the same database aggregation problem.

In an embodiment, level 501 represents a first level of recursion of a database aggregation process. As would be appreciated by a person of ordinary skill in the art, level 501 may correspond to steps 320 and 330 of the example embodiment of FIG. 3.

In an embodiment, level 502 represents a second level of recursion of a database aggregation process. As would be appreciated by a person of ordinary skill in the art, level 502 may correspond to step 340 of the example embodiment of FIG. 3.

In an embodiment, level 503 represents a third stage of a database aggregation process. As would be appreciated by a person of ordinary skill in the art, level 503 may correspond to step 350 of the example embodiment of FIG. 3. Moreover, as would be appreciated by a person of ordinary skill in the art, there may be additional levels of recursion.

In an embodiment, a database aggregation process in level 501 receives an input (e.g. a set of tuples) for aggregation. The database aggregation process then separates the input into a set of partitions for aggregation. In an embodiment, the database aggregation process may separate the input based on a hash function. For example, in an embodiment, the database aggregation process may separate the input into partitions based on a portion of a hash value generated by a hash function for one or more group by columns of the input.

In an embodiment, the database aggregation process in level 501 inserts a portion of the input (e.g. a set of tuples) into a block from a free list 504 based on the separation. In an embodiment, free list 504 is a collection of memory blocks that are consumed by the database aggregation process during aggregation. In an embodiment, the database aggregation process reserves a block for processing from free list 504. After the database aggregation process processes the block, the database aggregation process returns the block to free list 504.

In an embodiment, free list 504 may store at most a fixed number of blocks. As would be appreciated by a person of ordinary skill in the art, the maximum number of blocks in free list 504 may be chosen to balance memory usage and performance considerations. In an embodiment, the operating system allocates memory space for free list 504. But once the operating system allocates memory space, the database aggregation process controls the management of blocks in free list 504 during aggregation. Because the operating system allocates at most a fixed number of blocks to free list 504, the database aggregation process consumes at most a fixed amount of memory space.

In an embodiment, the database aggregation process in level 501 inserts a portion of the input corresponding to a partition in the set of partitions until a block selected from free list 504 is full. In an embodiment, the database aggregation process in level 501 may then retrieve a new block from free list 504 and insert the remaining portion of the input into the new block. The database aggregation process may insert the remaining portion of the input corresponding to the partition into the new block until the new block is full. In an embodiment, the database aggregation process may repeat the insertion of a portion of the input corresponding to a partition into blocks from free list 504 until the entire input is inserted into the blocks.

In an embodiment, the database aggregation process in level 501 may insert a block into a buffer 506 once the block is full. In an embodiment, a given buffer 506 stores a collection of full blocks for a given partition. In an embodiment, a given buffer 506 is associated with a given partition in the set of partitions. Specifically, each partition in the set of partitions has a corresponding buffer 506. A given buffer 506 may be stored in random-access memory (RAM), on a hard disk drive (HDD), or in another type of storage medium as would be appreciated by a person of ordinary skill in the art.

In an embodiment, a given buffer 506 stores blocks in first in first out (FIFO) order. Specifically, the database aggregation process retrieves a block from a given buffer 506 in the order the block was inserted into the given buffer 506.

In an embodiment, the database aggregation process in level 502 reads a block from a given buffer 506 that corresponds to a partition being processed by the database aggregation process in level 502. The database aggregation process then repeats the steps described above for the block read. Specifically, the database aggregation process may separate the input contained in the block read into a new set of partitions. In an embodiment, the database aggregation process may separate the input contained in the block read based on a hash function. For example, in an embodiment, the database aggregation process may separate the input contained in the block read into partitions based on a portion of a hash value generated by a hash function for one or more group by columns of the input contained in the block read.

In an embodiment, the database aggregation process in level 502 inserts a portion of the block read (e.g. a set of tuples) into a new block from free list 504 based on the separation performed in level 2. In an embodiment, the database aggregation process reserves a new block corresponding to a partition for processing the block read from free list 504. After the database aggregation process processes the block read, the database aggregation process returns the block read to free list 504.

In an embodiment, the database aggregation process in level 502 continues inserting the input contained in the blocks generated by the database aggregation process in level 501 into new blocks associated with a new set of partitions. In an embodiment, the database aggregation process in level 502 inserts the new blocks into buffers 506 in level 503. In an embodiment, the database aggregation process in level 502 inserts a new block into a given buffer 506 in level 503 based on the associated partition of the new block.

In an embodiment, the database aggregation process in level 503 repeats the above process of level 502 for the blocks inserted into buffers 506 in level 503. The database aggregation process in level 503 may then concatenate the results of level 503 at concatenate 508 into a final aggregated result.

In an embodiment, the database aggregation process may need to enforce certain constraints in order to ensure that efficient progress is made in the various levels of the pipeline. Specifically, in an embodiment, in order for the database aggregation process to run a level (e.g. level 501, level 502, and level 503) there needs to be blocks in the associated buffers 506 that the database aggregation process can process and there must be enough blocks in free list 504 for output by the database aggregation process.

In an embodiment, the data aggregation process may encounter three issues that prevent it from running a level. First, the database aggregation process may need a sufficient number of unreserved blocks in free list 504 in order to start processing a level. Second, the database aggregation process may need to be able to free memory at all times. Finally, the database aggregation process may need to ensure that reserved blocks are filled with data to a high degree.

In the first case, according to the example process of FIG. 5, let $m_i$ be the minimum number of blocks for a stage of level i and let l be the number of levels in the pipeline. Because the work of a stage of a last level of the pipeline consists of the database aggregation process merging its input to its output, the database aggregation process does not need to reserve additional blocks from the free list. Thus, $m_l$ is 0.

In an embodiment, the work of a stage other than the last level consists of the database aggregation process partitioning its input into a certain number of partitions. The database aggregation process may need to reserve one block per partition for these stages, e.g. $m_i = n_{partitions}$ where $n_{partitions}$ is the number of partitions the database aggregation process may produce. Thus, if there are not at least $m_i$ blocks in the free list 504, the database aggregation process may not be able to run a stage of level i.

However, this may not be sufficient in a parallel setup of the database aggregation process. This is because the database aggregation process may process a stage when there mi blocks in free list 504 and still not be able to reserve all required blocks. This is because other stages may have taken some blocks from free list 504 in the meantime. In an embodiment, the database aggregation process may prevent this problem by atomically reserving all blocks required for a stage from free list 504.

In the second case, according to the example process of FIG. 5, there may be a point in time where all blocks are in buffers 506 between level 501 and level 502. As a result, the free list 504 is empty. Thus, the database aggregation process in level 502 cannot get new blocks for its output. As a result, the database aggregation process cannot run level 502. Moreover, the database aggregation process cannot run other levels because all other buffers 506 are empty. In other words, the database aggregation process is in a deadlock.

In an embodiment, the database aggregation process may avoid the above deadlock problem by ensuring that a block can be reserved from free list 504 based on the condition that the number of unreserved blocks in free list 504 is sufficient to process all the input (e.g. tuples) from the block such that the block can be returned to free list 504. In other words, the database aggregation process may reserve a block from free list 504 only if there are sufficient blocks for the levels directly following it.

In an embodiment, the database aggregation process may recursively calculate the number of blocks needed by subsequent levels of a level i (e.g. $M_i$). Specifically, the database aggregation process may calculate the number of blocks needed by the last level (e.g. $m_l$) as 0, and the number of blocks needed by level i as $M_i = m_{i+1} + M_{i+1}$ where $m_{i+1}$ is the minimum number of blocks for a stage i as discussed above.

In the third case, according to the example process of FIG. 5, the database aggregation process may need to ensure that reserved blocks are filled with data to a high degree. This is because if blocks are not filled to a high degree, the database aggregation process may not only waste memory, but may also compromise the amortization effect of blockwise processing.

In an embodiment, in order to fill blocks to high degree, even in the presence of skew where all but a tiny fraction of the input belong to the same group, the above definitions of $m_i$ and $M_i$ can be refined. Specifically, a database aggregation process may calculate $m_l$, where l is the last level, as 0, and $m_i$, where i is level i, as $2(n_{partitions})^{l-i}$ for i<l.

In an embodiment, the database aggregation process, according to the example process of FIG. 5, may also encounter issues related the efficient scheduling of work in the pipelining. This is often caused by the performance overhead associated with switching between partitions. The database aggregation process may minimize this performance overhead by making intelligent decisions about what partition to process in a given level, and what level of the pipeline a given thread should work.

In an embodiment, the database aggregation process may minimize the cost of switching between partitions at a given level by choosing a partition with a lot of blocks to process. This ensures that the data aggregation process may work on a partition for a reasonably long time such that the costs of switching partitions can be amortized.

In an embodiment, the database aggregation process may maintain a priority queue of the non-empty partitions for each level in order to quickly find a partition with the most blocks in the associated input buffer 506. As would be appreciated by a person of ordinary skill in the art, a priority queue is a data structure where each element has a "priority" associated with it. In a priority queue, an element with high priority is served before an element with low priority.

In an embodiment, whenever a thread of the database aggregation process is looking for a job in a particular level of the pipeline, it may pop a top-most partition from the priority queue. Whenever the database aggregation process inserts blocks into a given buffer 506 of a given partition in a previous pipeline level, the priority of the given partition changes and the database aggregation process update the priority queue.

In an embodiment, the database aggregation process calculates the priority of a partition in the priority queue as $min(ceiling(\log n_{blocks}), p_{max})$ where $n_{blocks}$ is the number of blocks in an input buffer 506 of a partition and $p_{max}$ is a maximum priority value allowed.

In an embodiment, only a single thread of the database aggregation process can work on a given partition at each point in time. Specifically, when a thread of the database aggregation process pops a partition from the priority queue, that partition cannot be processed by any other thread of the database aggregation process. But if the input is very skewed, and the bulk of the work ends up in one partition, this can lead to a situation where only a single thread is working.

In order to prevent this situation, in another embodiment, the database aggregation process may perform work stealing. Specifically, when a thread of the database aggregation process pops the largest partition from the priority queue, the thread inserts the same partition back into the priority queue immediately. In addition, the database aggregation process calculates the priority of a partition for insertion into the priority queue as $min(ceiling(\log n_{blocks}/(P_{partition}+1)), p_{max})$ where $P_{partition}$ is the number of threads currently working on the partition in question. Thus, the database aggregation process does not calculate the priority based on the amount of blocks in an input buffer 506 of the partition, but rather on the amount of blocks in the input buffer 506 of the partition that each of the threads gets if the current thread choose to process that input buffer 506. Consequently, the database aggregation process performs work stealing only on a partition that is so full that each of the threads gets a larger amount of work by sharing the partition than by taking any of the other partitions exclusively.

In an embodiment, according to the example process of FIG. 5, the database aggregation process may also minimize performance overhead by making intelligent decisions about which level of the pipeline a given thread should work. This is often complicated due to the cyclic dependencies of the pipeline. Specifically, the database aggregation process may consume blocks with intermediate results of a previous stage only if they are available. Furthermore, the database aggregation process can produce these intermediate results only if free memory is available, and the database aggregation process can free memory only by consuming blocks with intermediate results. At the same time, it is important that when a thread of the database aggregation process works on a given partition that it continues to work on the partition for as long as possible in order to amortize the overhead of switching partitions. Thus, the database aggregation process should choose a level of the pipeline that allows it work on large partitions taking the dependencies of the stages into account.

In an embodiment for choosing which level of the pipeline a given thread should work, the database aggregation process dynamically maintains a balance between production and consumption of intermediate results while using as much of the available memory from free list 504 as possible. This often increases the average amount of work the threads of the database aggregation process do before they are rescheduled. Specifically, the database aggregation process chooses the pipeline level depending on how much of the available memory is currently being used.

Specifically, in an embodiment, if more than a ratio $m_{target}$ within the range (0, 1) is used, the database aggregation process assumes that it is about to run out of memory. If less than a ratio $m_{target}$ is used, the database aggregation process schedules threads to level 501 in order to produce more intermediate results. In an embodiment, whenever a thread of the database aggregation process does not find work in the level it was assigned to, it searches for work in the other level(s).

Figure 6:
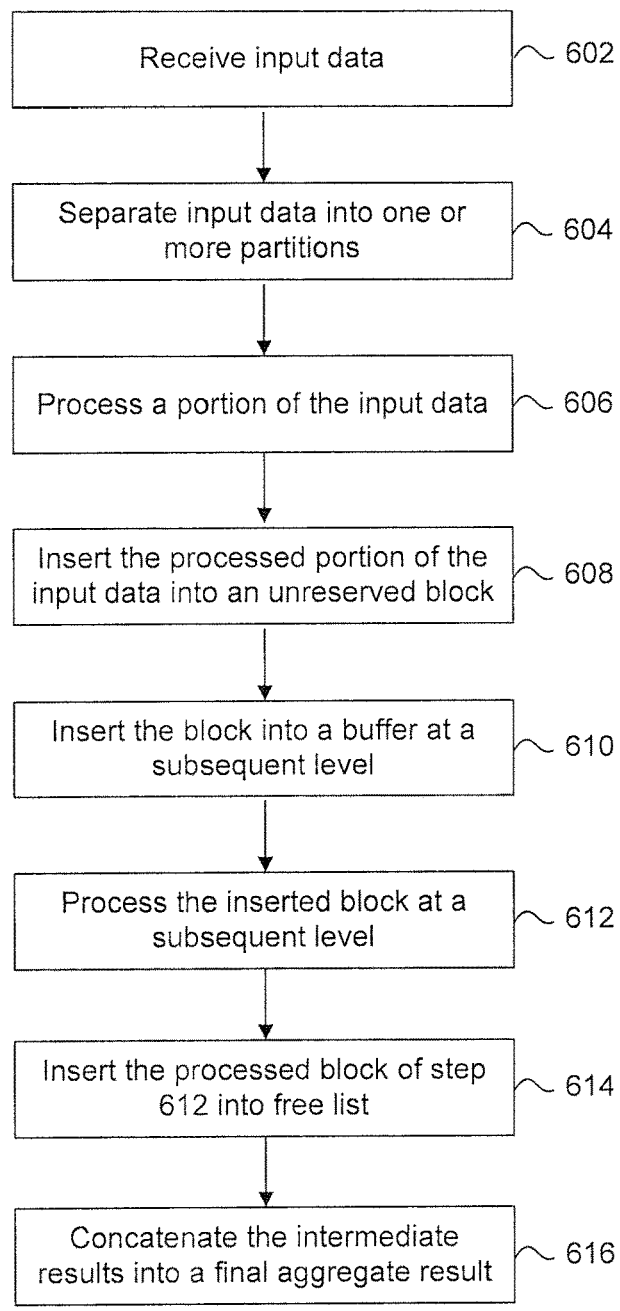
FIG. 6 is a flowchart illustrating a process for memory-constrained database aggregation, according to an example embodiment.

FIG. 6 is a flowchart illustrating a process for memory-constrained database aggregation, according to an example embodiment. Method 600 can be performed by processing logic that can comprise hardware (e.g., circuitry, dedicated logic, programmable logic, microcode, etc.), software (e.g., instructions executing on a processing device), or a combination thereof. As referenced above, method 600 may be an illustration of how memory-constrained aggregation is performed by DAS 102 according to the example process for memory-constrained database aggregation illustrated in FIG. 5, according to an embodiment.

In step 602, DAS 102 receives input data. For example, DAS 102 may receive input data from one or more systems or computers, including over a network. The input data may be received, and stored in main memory 106. Main memory 106 may include a database, table, or other memory, and the input data may be stored across one or more computing devices or processors.

As discussed above, in an embodiment, DAS 102 may receive the input data from a buffer 506 of the preceding pipeline level. In addition, in an embodiment, DAS 120 may select the level of the pipeline to work on based on how much memory is available in free list 504.

In step 604, DAS 102 separates the input data into one or more partitions. In an embodiment. DAS 102 may separate the input data based on a hash function. For example, DAS 102 may separate the input data based on a portion of a hash value generated by hashing one or more group by columns of the input data.

In step 606, DAS 102 processes a portion of the input (e.g. tuples) associated with a partition in the plurality of partitions based on the separating. As discussed above, in an embodiment, DAS 102 may select a partition to process based on the amount of blocks in the partition. In an embodiment, DAS 102 may perform this selection using a priority queue. In another embodiment, DAS 102 may perform this partition selection with work stealing as discussed above.

In step 608, DAS 102 inserts the processed portion of the input into an unreserved block from free list 504. In an embodiment, DAS 102 marks this block as reserved.

In step 610, DAS 102 inserts the block of step 608 into a buffer 506 at the subsequent level. In an embodiment, this buffer 506 corresponds to the partition associated with input data contained in the block.

In step 612, DAS 102 processes the block inserted into the buffer 506 in the subsequent level. Specifically, DAS 102 performs the same receiving, separating, processing, and insertion as performed in steps 602-606. However, DAS 102 performs these steps on a smaller size input data (e.g. the block inserted into the buffer 506). As would be appreciated by a person of ordinary skill in the art, DAS 102 may perform step 612 using a different thread than was used in a preceding level.

In step 614, DAS 102 inserts the processed block back into free list 504. As would be appreciated by a person of ordinary skill in the art, by inserting the processed block back into free list 504, DAS 102 guarantees that no more than a maximum number of blocks are ever used during aggregation.

In step 616, DAS concatenates the above intermediate results in a final aggregate result.

Figure 7:
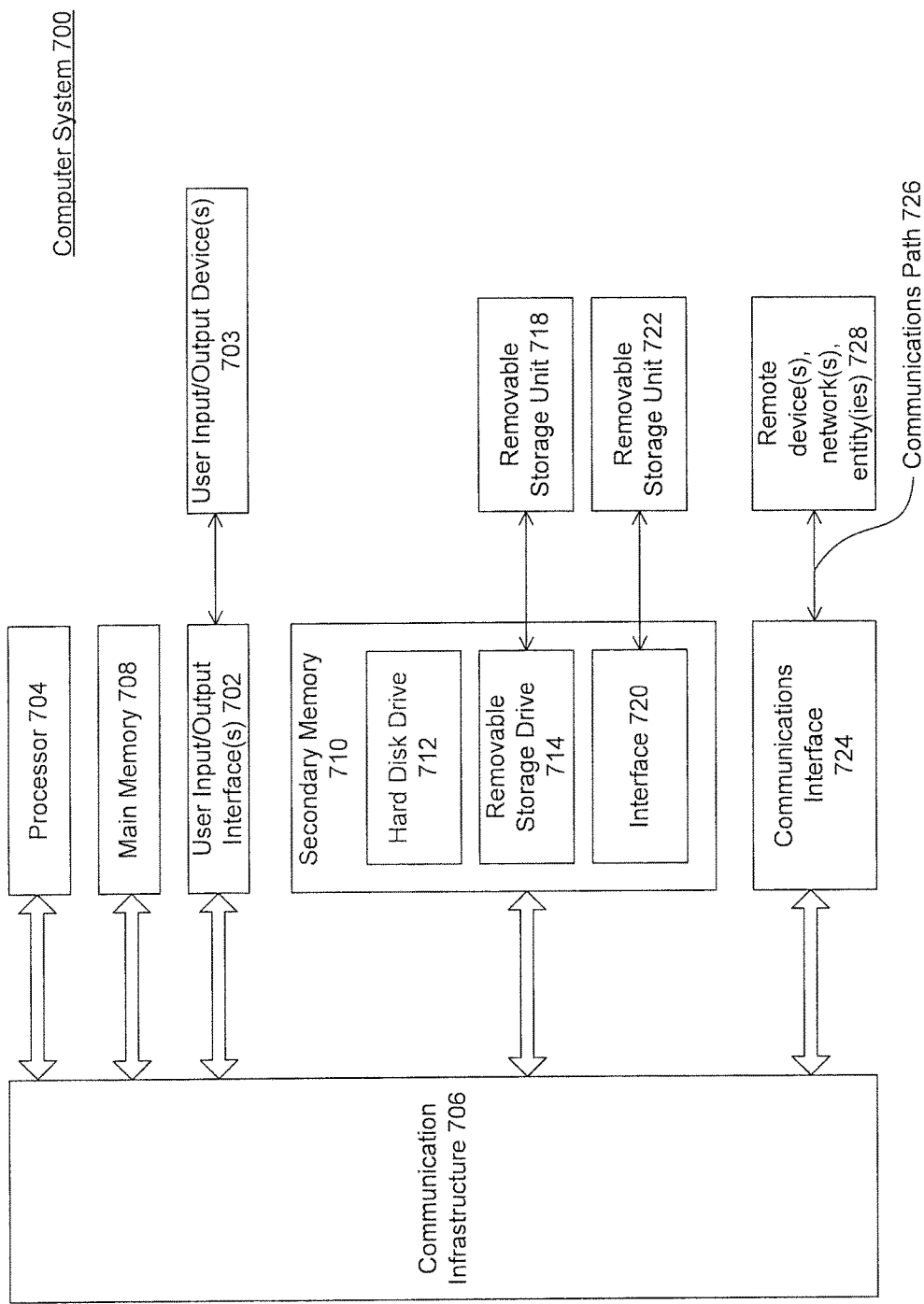
FIG. 7 is an example computer system useful for implementing various embodiments.

Various embodiments can be implemented, for example, using one or more well-known computer systems, such as computer system 700 shown in FIG. 7. Computer system 700 can be any well-known computer capable of performing the functions described herein.

Computer system 700 includes one or more processors (also called central processing units, or CPUs), such as a processor 704. Processor 704 is connected to a communication infrastructure or bus 706.

One or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an embodiment, a tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 7. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method for aggregating tuples, comprising:
   separating, by at least one processor, the tuples into a plurality of partitions using a hash function;
   first processing, by the at least one processor, a portion of the tuples associated with a partition in the plurality of partitions based on the separating;
   reserving, by the at least one processor, a first block for the partition from a free list based on a minimum number of blocks in the free list to perform a second processing and a third inserting;
   first inserting, by the at least one processor, the processed portion of the tuples into the first block;
   second inserting, by the at least one processor the first block into a buffer associated with the partition;
   performing the second processing, by the at least one processor, the first block in the buffer; and
   performing the third inserting, by the at least one processor, the processed first block into the free list,
   wherein at least one of the separating, first processing, first inserting, second inserting, second processing, and third inserting is performed by one or more computers.

2. The method of claim 1, further comprising:
   reserving, by the at least one processor, a second block for the partition from the free list.

3. The method of claim 1, wherein the free list contains less than a fixed number of blocks.

4. The method of claim 1, further comprising:
   selecting, by the at least one processor, the partition from the plurality of partitions to perform the first processing based on a priority value, wherein the priority value is based on a number of blocks in the partition.

5. The method of claim 1, further comprising:
   assigning, by the at least one processor, a thread to perform either the separating, first processing, first inserting, and second inserting or the second processing and the third inserting, wherein the assigning is based on a number of reserved blocks in the free list.

6. The method of claim 1, wherein the separating, first processing, first inserting, and second inserting are performed using a first thread and the second processing and the third inserting are performed using a second thread.

7. The method of claim 1, the separating further comprising:
   separating the tuples into the plurality of partitions based on a size of a cache.

8. The method of claim 1, wherein a size of the partition is less than a size of a cache.

9. The method of claim 1, further comprising:
   sorting the portion of the tuples associated the partition based on the separating.

10. A system, comprising:
    a memory; and
    at least one processor coupled to the memory and configured to:
      separate tuples into a plurality of partitions using a hash function;
      first process a portion of the tuples associated with a partition in the plurality of partitions based on the separation;
      reserve a first block for the partition from a free list based on a minimum number of blocks in the free list to perform a second process and a third insert;
      first insert the processed portion of the tuples into the first block;
      second insert the first block into a buffer associated with the partition;
      perform the second process the first block in the buffer; and
      perform the third insert the processed first block into the free list.

11. The system of claim 10, the at least one processor further configured to:
    reserve a second block for the partition from the free list.

12. The system of claim 10, wherein the free list contains less than a fixed number of blocks.

13. The system of claim 10, the at least one processor further configured to:
    select the partition from the plurality of partitions to perform the first process based on a priority value, wherein the priority value is based on a number of blocks in the partition.

14. The system of claim 10, the at least one processor further configured to:

assign a thread to perform either the separate, first process, first insert, and second insert or the second process and the third insert, wherein the assignment is based on a number of reserved blocks in the free list.

15. The system of claim 10, wherein the at least one processor is configured to perform the separate, first process, first insert, and second insert using a first thread and the second process and the third insert using a second thread.

16. A tangible computer-readable device having instructions stored thereon that, when executed by at least one computing device, causes the at least one computing device to perform operations comprising:

separating tuples into a plurality of partitions using a hash function;

first processing a portion of the tuples associated with a partition in the plurality of partitions based on the separating;

reserving a first block for the partition from a free list based on a minimum number of blocks in the free list to perform a second processing and a third inserting;

first inserting the processed portion of the tuples into the first block;

second inserting the first block into a buffer associated with the partition;

performing the second processing the first block in the buffer; and performing the third inserting the processed first block into the free list.

17. The computer-readable device of claim 16, the operations further comprising:

reserving a second block for the partition from the free list.

18. The computer-readable device of claim 16, wherein the free list contains less than a fixed number of blocks.

19. The computer-readable device of claim 16, the operations further comprising:

selecting the partition from the plurality of partitions to perform the first processing based on a priority value, wherein the priority value is based on a number of blocks in the partition.

20. The computer-readable device of claim 16, the operations further comprising:

assigning a thread to perform either the separating, first processing, first inserting, and second inserting or the second processing and the third inserting, wherein the assigning is based on a number of reserved blocks in the free list.

* * * * *